United States Patent
Naoi et al.

(10) Patent No.: US 10,185,315 B2
(45) Date of Patent: Jan. 22, 2019

(54) MOTOR CONTROL SYSTEM AND MOTOR CONTROL METHOD

(71) Applicant: Hitachi Automotive Systems, Ltd., Hitachinaka-shi, Ibaraki (JP)

(72) Inventors: Shigeru Naoi, Hitachinaka (JP); Atsushi Uehara, Hitachinaka (JP); Takashi Nagai, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 261 days.

(21) Appl. No.: 15/107,127

(22) PCT Filed: Jan. 14, 2015

(86) PCT No.: PCT/JP2015/050708
§ 371 (c)(1),
(2) Date: Jun. 22, 2016

(87) PCT Pub. No.: WO2015/129311
PCT Pub. Date: Sep. 3, 2015

(65) Prior Publication Data
US 2017/0220035 A1 Aug. 3, 2017

(30) Foreign Application Priority Data
Feb. 25, 2014 (JP) .................................. 2014-033951

(51) Int. Cl.
*G05B 23/02* (2006.01)
*H02P 5/00* (2016.01)
(Continued)

(52) U.S. Cl.
CPC ........... *G05B 23/0286* (2013.01); *G05B 9/03* (2013.01); *H02P 5/00* (2013.01); *H02P 29/032* (2016.02); *B60W 50/029* (2013.01)

(58) Field of Classification Search
CPC .............................. G05B 23/0286; H02P 5/00
See application file for complete search history.

(56) References Cited

U.S. PATENT DOCUMENTS 4,141,066 A * 2/1979 Keiles ...................... G05B 9/03
700/81
4,363,094 A * 12/1982 Kaul ................... G06F 13/4217
710/113
(Continued)

FOREIGN PATENT DOCUMENTS

CN 102208888 A 10/2011
CN 102511124 A 6/2012
(Continued)

OTHER PUBLICATIONS

Chinese-language Office Action issued in counterpart Chinese Application No. 201580005564.7 dated Dec. 20, 2017 with English translation (Twenty-Five (25) pages).
(Continued)

*Primary Examiner* — Mark A Connolly
(74) *Attorney, Agent, or Firm* — Crowell & Moring LLP

(57) ABSTRACT

Electronic control units (ECUs) provided with circuits for backing up other ECUs lack versatility and increase costs. In the present invention, motor control ECUs respectively control motors via signal wires that perform motor control. In addition, a dedicated substitute ECU is connected to each motor via signal wires that perform motor control. A substitute control circuit part of the dedicated substitute ECU runs to a network, is continuously receiving malfunction information and stability information via a signal wire, and detects the malfunction of the motor control ECU from said information. Then the dedicated substitute ECU substitutes for the motor control ECU and performs a backup operation to continue control of the motor via the signal wire.

14 Claims, 11 Drawing Sheets

(51) Int. Cl.
  *G05B 9/03* (2006.01)
  *H02P 29/032* (2016.01)
  *B60W 50/029* (2012.01)

(56) References Cited

U.S. PATENT DOCUMENTS

| | | | | |
|---|---|---|---|---|
| 5,372,540 | A * | 12/1994 | Burch | B23Q 1/00 |
| | | | | 452/156 |
| 6,252,367 | B1 * | 6/2001 | Sakamoto | G05B 19/39 |
| | | | | 318/560 |
| 6,332,198 | B1 * | 12/2001 | Simons | G06F 1/14 |
| | | | | 370/217 |
| 7,941,253 | B1 * | 5/2011 | Brant | B63H 25/42 |
| | | | | 701/21 |
| 2002/0099487 | A1 | 7/2002 | Suganuma et al. | |
| 2004/0128042 | A1 * | 7/2004 | Takahashi | B62D 5/003 |
| | | | | 701/41 |
| 2006/0276947 | A1 * | 12/2006 | Kaita | H01H 47/002 |
| | | | | 701/48 |
| 2008/0007196 | A1 | 1/2008 | Tan et al. | |
| 2009/0143940 | A1 * | 6/2009 | Rhodes | B62D 11/02 |
| | | | | 701/41 |
| 2010/0188055 | A1 | 7/2010 | Patterson | |
| 2011/0241447 | A1 | 10/2011 | Ando et al. | |
| 2011/0266964 | A1 | 11/2011 | Schlenk et al. | |
| 2011/0266984 | A1 | 11/2011 | Watanabe et al. | |
| 2012/0187885 | A1 | 7/2012 | Hama | |

FOREIGN PATENT DOCUMENTS

| | | |
|---|---|---|
| EP | 1 426 266 A2 | 6/2004 |
| JP | 8-116675 A | 5/1996 |
| JP | 2002-221075 A | 8/2002 |
| JP | 2006-51922 A | 2/2006 |
| JP | 2008-5624 A | 1/2008 |
| JP | 2008-248732 A | 10/2008 |
| JP | 2011-234517 A | 11/2011 |
| JP | 2013-141370 A | 7/2013 |

OTHER PUBLICATIONS

Extended European Search Report issued in counterpart European Application No. 15754943.7 dated Nov. 30, 2017 (Ten (10) pages).
International Search Report (PCT/ISA/210) issued in PCT Application No. PCT/JP2015/050708 dated May 12, 2015 with English-language translation (four (4) pages).
Japanese-language Written Opinion (PCT/ISA/237) issued in PCT Application No. PCT/JP2015/050708 dated May 12, 2015 (four (4) pages).

* cited by examiner

FIG. 2

| No. | MOTOR CONTROL ECU No. | ORDER OF PRIORITY |
|---|---|---|
| 1 | 1 | 1 |
| 2 | 2 | 3 |
| 3 | 3 | 2 |
| 4 | 4 | 5 |
| 5 | 5 | 6 |
| 6 | 6 | 3 |

FIG. 3

| No. | MOTOR CONTROL ECU No. | REQUIRED FUNCTIONS OF CONTROL CIRCUIT PART | | | | | | | |
|---|---|---|---|---|---|---|---|---|---|
| | | DURING NORMAL STATE | | | | DURING MALFUNCTION STATE | | | |
| | | A | B | C | D | A | B | C | D |
| 1 | 1 | × | × | | × | | × | | × |
| 2 | 2 | × | × | × | | | × | | |
| 3 | 3 | × | × | | × | | × | | |
| 4 | 4 | × | × | × | × | | × | | × |
| 5 | 5 | × | | | × | | | | × |
| 6 | 6 | | × | × | | | × | | |

FIG. 6

| No. | MOTOR CONTROL ECU No. | SUBSTITUTION-CAPABLE MOTOR CONTROL ECU No. |
|---|---|---|
| 1 | 1 | 2,3,4,5,6 |
| 2 | 2 | 3,6 |
| 3 | 3 | 1,2,4,5,6 |
| 4 | 4 | 1,2,3,5,6 |
| 5 | 5 | NIL |
| 6 | 6 | 2,3 |

*FIG. 7*

| No. | MOTOR CONTROL ECU No. | SUBSTITUTION-CAPABLE MOTOR CONTROL ECU No. | MOTOR CONTROL RATE |
|---|---|---|---|
| 1 | 1 | 2 | 25% |
| 2 | | 3 | 30% |
| 3 | | 4 | 15% |
| 4 | | 5 | 10% |
| 5 | | 6 | 25% |
| 6 | 2 | 3 | 60% |
| 7 | | 6 | 50% |
| 8 | 3 | 1 | 75% |
| 9 | | 2 | 40% |
| 10 | | 4 | 30% |
| 11 | | 5 | 25% |
| 12 | | 6 | 40% |
| 13 | 4 | 1 | 85% |
| 14 | | 2 | 60% |
| 15 | | 3 | 70% |
| 16 | | 5 | 40% |
| 17 | | 6 | 60% |
| 18 | 6 | 2 | 50% |
| 19 | | 3 | 60% |

FIG. 8

| No. | REQUEST | MOTOR PRIORITY ORDER |
|---|---|---|
| 1 | STOP MOTOR 100 | 1 |
| 2 | STOP MOTOR 300 | 2 |
| 3 | STOP MOTOR 200 | 3 |
| 4 | STOP MOTOR 600 | 4 |
| 5 | STOP MOTOR 400 | 5 |
| 6 | STOP MOTOR 500 | 6 |
| 7 | ROTATE MOTOR 100 IN RIGHT | 7 |
| 8 | ROTATE MOTOR 300 IN RIGHT | 8 |
| 9 | ROTATE MOTOR 100 IN LEFT | 9 |
| 10 | ROTATE MOTOR 300 IN LEFT | 10 |
| 11 | ROTATE MOTOR 200 IN RIGHT | 11 |
| 12 | ROTATE MOTOR 200 IN LEFT | 12 |
| ⋮ | ⋮ | ⋮ |
| m | ROTATE MOTOR 500 IN LEFT | m |

MOTOR CONTROL SYSTEM AND MOTOR CONTROL METHOD

TECHNICAL FIELD

The present invention relates to a motor control system and a motor control method for continuing a motor control when a malfunction occurs in a motor control ECU.

BACKGROUND ART

In automobiles, motors used with motorization of various kinds of functions are increasing, and their importance is growing. Then, in a motor control ECU (Electronic Control Unit) for controlling a motor, a backup measure is required in a case where a malfunction occurs in the motor control ECU.

A backup measure in a case where a motor control ECU malfunctions is considered to include a measure for duplexing an important motor control ECU and using another of the motor control ECUs when one of the motor control ECUs malfunctions.

In PTL 1, in a configuration in which ECUs having a sensor processing function, a master function, and an actuator control function are connected on a network, a master function is provided in the ECU having the actuator control function, and when the ECU having the master function malfunctions, a control is performed by using the master function provided in the ECU having the actuator control function without relying on the ECU having the master function.

In PTL 2, another of the control units performs backup in a case where one of the control units malfunctions, on the basis of the fact that a driving control and a regenerative control performed by a first control unit controlling a synchronous motor and a second control unit controlling a synchronous generator are controls inextricably linked to each other. Since the another of the control units performs backup, a circuit for backing up the other of the control units is provided in each of the control units.

CITATION LIST

Patent Literature

PTL 1: Japanese Patent Laid-Open No. 2006-51922
PTL 2: Japanese Patent Laid-Open No. 2011-234517

SUMMARY OF INVENTION

Technical Problem

However, in a configuration in which each of the ECUs has a function and a circuit for backing up the other of the ECUs as shown in PTLs 1, 2, the versatility is lost, and the cost increases.

Solution to Problem

A motor control system according to the present invention includes a plurality of motors and a dedicated substitute ECU connected to a plurality of motor control ECUs controlling the motors in association with the motors, wherein in a case where a malfunction occurs in any one of the motor control ECUs, the dedicated substitute ECU controls the motor connected to the motor control ECU in which the malfunction has occurred.

In a motor control method according to the present invention, a dedicated substitute ECU is connected to a plurality of motors and a plurality of motor control ECUs controlling the motors in association with the motors, and in a case where a malfunction occurs in any one of the motor control ECUs, the dedicated substitute ECU controls the motor connected to the motor control ECU in which the malfunction has occurred.

Advantageous Effects of Invention

According to the present invention, the motor control ECU can be backed up at a low cost and a high versatility.

BRIEF DESCRIPTION OF DRAWINGS

FIG. 2 is a figure illustrating a priority order table.
FIG. 3 is a figure illustrating a control function table.
FIG. 6 is a figure illustrating a substitution-capable ECU table.
FIG. 7 is a figure illustrating a motor control rate table.
FIG. 8 is a figure illustrating a motor priority order table.

DESCRIPTION OF EMBODIMENTS

First Embodiment

Figure 1:
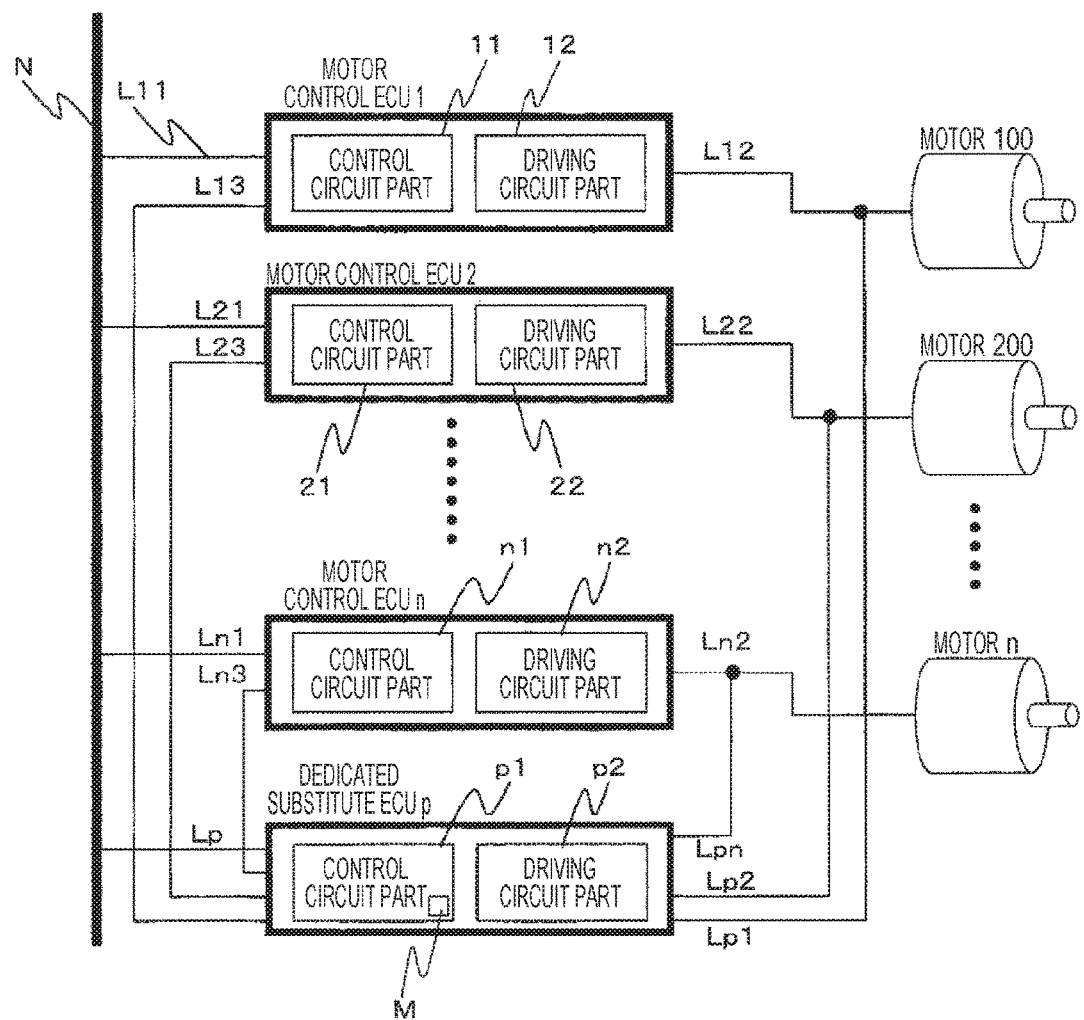
FIG. 1 is a configuration diagram illustrating a motor control system according to a first embodiment.

FIG. 1 is a configuration diagram illustrating a motor control system according to the first embodiment.

The motor control system includes n motors from a motor 100 to a motor n, and includes n motor control ECUs from a motor control ECU 1 and a motor control ECUn in association with the motors 100 to n. Further, the motor control system includes a single dedicated substitute ECUp functioning as an alternative to one of the motor control ECUs 1 to n in a case where the one of the motor control ECUs 1 to n malfunctions. It should be noted that the motors 100 to n are motors for activating, for example, a steering, a brake, a parking brake, a wiper, a door mirror, a seat belt, and the like, which are provided in accordance with motorization of automobiles.

The motor control ECUs 1 to n control the motors 100 to n, respectively, via signal wires L12 to Ln2 controlling the motors. The dedicated substitute ECUp is connected via signal wires Lp1 to Lpn to the motors 100 to n, and is configured to control the motors 100 to n.

The motor control ECUs 1 to n are connected to the network N via the signal wires L11 to Ln1, and the dedicated substitute ECUp is connected to the network N via the signal wire Lp. More specifically, the dedicated substitute ECUp is connected via the signal wire Lp, the network N, and the signal wires L11 to Ln1 to the motor control ECUs 1 to n.

Various kinds of control information, malfunction information indicating that the motor control ECUs 1 to n malfunctioned, living information indicating that the motor control ECUs 1 to n are functioning normally, and the like are exchanged between the motor control ECUs 1 to n and between the motor control ECUs 1 to n and the dedicated substitute ECUp. Although not illustrated in the drawings, in a case where another ECU exists on the network N, the above information is exchanged with another ECU as necessary.

The motor control ECUs 1 to n and the dedicated substitute ECUp are connected via the signal wires L13 to Ln3, and the dedicated substitute ECUp exchanges information for controlling the motors 100 to n. However, in a case where the dedicated substitute ECUp can control each of the motors 100 to n by only exchanging the information via the network N, the signal wires L13 to Ln3 connected to the motor control ECUs 1 to n may not be provided.

The motor control ECUs 1 to n include control circuit parts 11 to n1 and driving circuit parts 12 to n2. The dedicated substitute ECUp includes a substitute control circuit part p1 and a substitute driving circuit part p2.

The control circuit parts 11 to n1 exchange the above information via the network N with another of the motor control ECUs 1 to n and the dedicated substitute ECUp. Further, the control circuit parts 11 to n1 generate a control signal such as a PWM signal for controlling the motors 100 to n on the basis of a torque command.

The driving circuit parts 12 to n2 drive the motors 100 to n on the basis of a control signal from the control circuit parts 11 to n1. For example, the driving circuit parts 12 to n2 have an inverter constituted by six switching devices (for example, IGBTs) not shown. A switching device is controlled on the basis of a PWM signal sent from the control circuit parts 11 to n1, and the motors 100 to n are driven via the signal wires L12 to Ln2.

The substitute control circuit part p1 of the dedicated substitute ECUp exchanges the above information with the motor control ECUs 1 to n via the network N, and has a storage unit M storing a priority order and the like, explained later. Further, the substitute control circuit part p1 generates a control signal such as a PWM signal for controlling any one of the motors 100 to n instead of the malfunctioning motor control ECUs 1 to n.

The substitute driving circuit part p2 of the dedicated substitute ECUp drives the motors 100 to n on the basis of a control signal from the substitute control circuit part p1. For example, the substitute driving circuit part p2 includes an inverter constituted by six switching devices (for example, IGBTs) not shown. A switching device is controlled on the basis of a PWM signal sent from the substitute control circuit part p1, and any one of the motors 100 to n is driven via the signal wires Lp1 to Lpn.

Hereinafter, an operation of a motor control system according to a first embodiment will be explained.

In a case where any one of the motor control ECUs 1 to n, for example, the control circuit part 11 of the motor control ECU 1, malfunctions, the motor control ECU 1 transmits malfunction information indicating that the motor control ECU 1 is malfunctioning to the network N via the signal wire L11. Alternatively, the living information indicating that the motor control ECU 1 is normally functioning is no longer transmitted to the network N. A case where the living information is no longer transmitted to the network N includes a case where the motor control ECU 1 completely malfunctions, and the motor control ECU 1 can no longer transmit the malfunction information indicating that the motor control ECU 1 is malfunctioning.

The malfunction of the driving circuit parts 12 to n2 of the motor control ECUs 1 to n is detected when the control circuit parts 11 to n1 performs diagnosis of the driving circuit parts 12 to n2. The control circuit parts 11 to n1 transmit the malfunction information to the network N via the signal wire L11.

The substitute control circuit part p1 of the dedicated substitute ECUp always receives the malfunction information and the living information, transmitted through the network N, via the signal wire Lp, and detects, from such information, that the motor control ECU 1 is malfunctioning. Then, instead of the motor control ECU 1, the dedicated substitute ECUp performs backup operation for continuing control of the motor 100 via the signal wire Lp1.

In a case where another of the motor control ECUs 2 to n malfunctions when the motor control ECU 1 malfunctioned and the dedicated substitute ECUp is performing the backup operation, the dedicated substitute ECUp may perform the backup operation for both of them in parallel, or the dedicated substitute ECUp may give a higher priority to the motor control ECU 1 for which the backup operation has already been performed, so that the dedicated substitute ECUp may not perform the backup operation of the motor control ECUs 2 to n that malfunctioned at a later point in time. Alternatively, a backup operation based on a priority order explained later may be performed.

Priority Order

Subsequently, an example for performing a backup operation by giving a priority order will be explained with reference to FIG. 2. FIG. 2 is a figure illustrating a priority order table. The priority order table is a priority order table in which there are six motor control ECUs of FIG. 1 (n=6), and the priority orders of the motor control ECU 1 to the motor control ECU 6 are shown. This table is stored in the storage unit M of the substitute control circuit part p1 of the dedicated substitute ECUp. In the priority order, a smaller number indicates a higher priority, and a larger number indicates a lower priority.

For example, if the motor control ECU 2 malfunctions, the dedicated substitute ECUp performs backup operation for continuing to control the motor 200. At this occasion, in a case where the motor control ECU 6 having a priority order "6" malfunctions, the dedicated substitute ECUp refers to the priority order table stored in the storage unit M. The priority order of the motor control ECU 2 is three, and the priority order of the motor control ECU 6 is three, which means that the priority orders are the same, and therefore, the backup operation for continuing control of the motor 200 is continued.

On the other hand, in a case where the motor control ECU 1 having a priority order "1" newly malfunctions when the motor control ECU 2 functions and the backup operation for continuing control of the motor 200 is being performed, the dedicated substitute ECUp stops the backup operation for continuing control of the motor 200 and performs the backup operation for continuing control of the motor 100 because the motor control ECU 1 that has newly malfunctioned has a higher priority order than the motor control ECU 2 for which the backup operation is currently being performed. More specifically, the dedicated substitute ECUp performs the backup operation for continuing control of the motor 100 via the signal wire Lp1 instead of the motor control ECU 1.

As described above, in a case where two or more motor control ECUs 1 to n malfunction, the dedicated substitute ECUp controls one of the motors 100 to n connected to the motor control ECUs 1 to n that has the highest priority order among the multiple motor control ECUs 1 to n that have malfunctioned.

Control Function

FIG. 3 is a figure illustrating an example of a control function table referred to when the dedicated substitute ECUp performs the backup operation of the motor control ECUs 1 to n. The control function table illustrates a case where it is assumed that there are six motor control ECUs 1 to n of FIG. 1 (n=6). This table is stored in the storage unit M of the substitute control circuit part p1 of the dedicated substitute ECUp. In this table, the control function provided in the control circuit parts 11 to 61 in the motor control ECU 1 to the motor control ECU 6 are classified into four types, i.e., A, B, C, D, and a control function executed by the control circuit parts 11 to 61 in a normal state is denoted with "X" in a corresponding field, and a minimum required control function in order for the dedicated substitute ECUp to control the motors 100 to n when the control circuit parts 11 to 61 malfunction is denoted with "X" in a corresponding field.

For example, the control function A is an electric current feed back control function, and is configured to detect an electric current flowing to a motor, and feeds back the detected electric current for the motor control, so that the control function A is used for a torque control and a protection function. The control function B is a speed-sensitive control function, and is configured to change the rotation speed and the torque of the motor in synchronization with the speed of the vehicle. The control function C is a voltage feed back control function, and is configured to detect a voltage applied to a motor, and feeds back the voltage for motor control, so that the control function C is used for a torque control and a protection function. The control function D is an acceleration-sensitive control function, and is configured to change the rotation speed and the torque of the motor in synchronization with the acceleration of the vehicle. The speed-sensitive control function, which is the control function B, and the acceleration-sensitive control function, which is the control function D, are minimum required control functions when the control circuit parts 11 to n1 of the motor control ECUs 1 to n malfunction.

When any one of the motor control ECUs 1 to 6 malfunctions, the substitute control circuit part p1 of the dedicated substitute ECUp refers to the control function table as illustrated in FIG. 3, selects a control function indicated as "X" in the field for the motor control ECU in the malfunctioning state, and performs backup operation. Accordingly, the minimum required control function for the malfunctioning state can be executed by the substitute control circuit part p1. For example, in a case where the motor control ECU 1 is malfunctioning, the control functions B, D are selected as the control functions of the substitute control circuit part p1 in the backup state in accordance with the control function table as illustrated in FIG. 3, and the backup operation for continuing control of the motor 100 is performed.

Modification of First Embodiment

A modification of the first embodiment will be explained with reference to FIG. 4.

Figure 4:
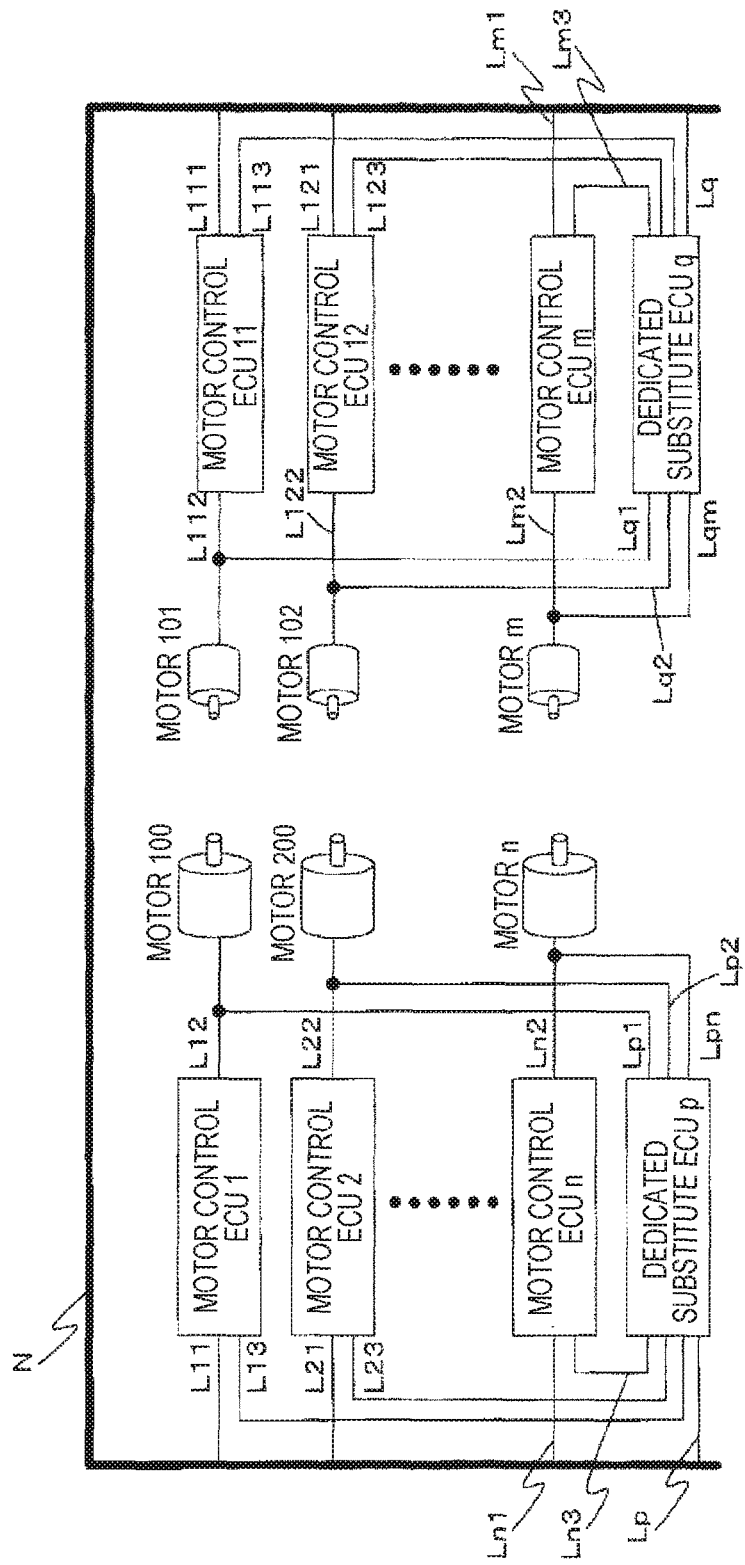
FIG. 4 is a configuration diagram illustrating a motor control system according to a modification of the first embodiment.

FIG. 4 is a configuration diagram illustrating a motor control system.

In the motor control system, multiple motors 100 to n, 101 to m, and motor control ECUs 1 to n, 11 to m are divided into two groups, and the motor control system has such a configuration including dedicated substitute ECUs p, q for the groups.

A first group includes the motor 100 to the motor n, the motor control ECU 1 to the motor control ECUn, and the dedicated substitute ECUp. A second group includes the motor 101 to the motor m, the motor control ECU 11 to the motor control ECUm, and the dedicated substitute ECUq. The motor control ECUs 1 to n include a control circuit part and a driving circuit part as explained in FIG. 1, and likewise, each of the dedicated substitute ECUs p, q include a control circuit part and a driving circuit part, but the configurations thereof are the same as that of the first embodiment, and are therefore not illustrated.

The configuration of the first group and the configuration of the second group are the same as that of the first embodiment, but the dedicated substitute ECUp, ECUq of each group performs backup operation in a case where a malfunction occurs in a motor control ECU in a corresponding group.

In a case where a malfunction occurs, for example, in any one of the first motor control ECUs 1 to n, the dedicated substitute ECUp is used to perform the backup operation for continuing control of the motors 100 to n connected to the motor control ECUs 1 to n in which the malfunction has occurred. A storage unit, not shown, stores a fact that the dedicated substitute ECUp is the motor control ECU which the first motor control ECUs 1 to n belong to the group. The dedicated substitute ECUp always receives the malfunction information and the living information, transmitted through the network N, via the signal wire Lp, and in a case where a malfunction occurs in any one of the first motor control ECUs 1 to n, the dedicated substitute ECUp detects this from such information.

For example, in a case where a malfunction occurs in any one of the second motor control ECUs 11 to m, the dedicated substitute ECUq is used to perform the backup operation for continuing control of the motor connected to the motor control ECUs 11 to m in which the malfunction has occurred. A storage unit, not shown, stores a fact that the dedicated substitute ECUq is the motor control ECU which the second motor control ECUs 11 to m belong to the group. The dedicated substitute ECUq always receives the malfunction information and the living information, transmitted through the network N, via the signal wire Lq, and in a case where a malfunction occurs in any one of the second motor control ECUs 11 to m, the dedicated substitute ECUq detects this from such information.

In the above example, an example including two groups has been shown, but the number of groups may be two or more depending on a motor control system. A motor control ECU that does not require backup operation may not belong to any group. Further, like the first embodiment, each of the storage units of the dedicated substitute ECUs p, q may store a priority order table, and the backup operation for giving priority to a control for a motor having a high priority order in each group and continuing the control may be performed. Further, like the first embodiment, each of the storage units of the dedicated substitute ECUs p, q may store a control function table, and the dedicated substitute ECUs p, q in the groups may select minimum required control functions for the malfunctioning motor control ECU, and the backup operation may be performed.

Second Embodiment

Figure 5:
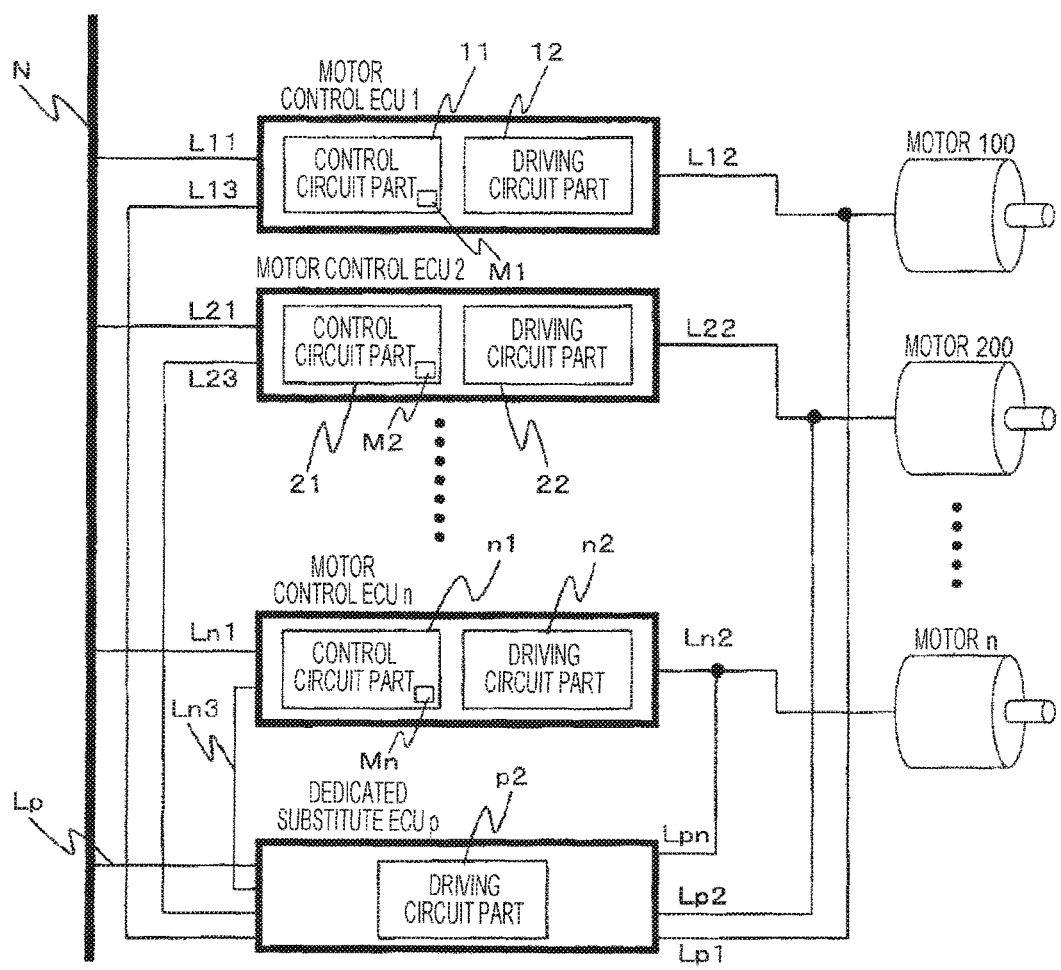
FIG. 5 is a configuration diagram illustrating a motor control system according to a second embodiment.

FIG. 5 is a configuration diagram illustrating a motor control system according to a second embodiment.

The motor control ECUs 1 to n includes control circuit parts 11 to n1 and driving circuit parts 12 to n2. The connection state of the motor control ECUs 1 to n and the configurations of the control circuit parts 11 to n1 and the driving circuit parts 12 to n2 are the same as those of the first embodiment, and the explanation thereabout is omitted. It should be noted that the control circuit parts 11 to n1 of the motor control ECUs 1 to n include storage units M1 to Mn storing a priority order table, a control function table, a substitution-capable ECU table, a motor control rate table, a motor priority order table, and the like, explained later.

The dedicated substitute ECUp includes the substitute driving circuit part p2, but does not include any substitute control circuit part generating a control signal such as a PWM signal for controlling the motors 100 to n. The dedicated substitute ECUp exchanges information with the motor control ECUs 1 to n via the network N and the signal wire Lp. Further, when any one of the motor control ECUs 1 to n malfunctions, the dedicated substitute ECUp receives a control signal such as a PWM signal for controlling the motors 100 to n from any one of the motor control ECUs 1 to n that is not malfunctioning, and outputs the control signal to the substitute driving circuit part p2.

Hereinafter, an operation of the motor control system according to the second embodiment will be explained.

In a case where any one of the motor control ECUs 1 to n, for example, the driving circuit part 12 of the motor control ECU 1, malfunctions, the motor control ECU 1 stops the output of the driving circuit part 12, obtains a use right of the dedicated substitute ECUp via the signal wire L11, the network N, and the signal wire Lp, and transmits a control signal such as a PWM signal for controlling the motor 100 to the substitute driving circuit part p2 of the dedicated substitute ECUp via the signal wire L13, and performs the backup operation for continuing control of the motor 100.

In a case where any one of the motor control ECUs 1 to n, for example, the control circuit part 11 of the motor control ECU 1, malfunctions, another of the motor control ECUs 2 to n, for example, the motor control ECU 2, detects a malfunction of the motor control ECU 1 via the signal wire L21, the network N, and the signal wire L11. Then, the motor control ECU 2 obtains the use right of the dedicated substitute ECUp via the signal wire L21, the network N, and the signal wire Lp, and transmits a control signal such as a PWM signal for controlling the motor to the substitute driving circuit part p2 of the dedicated substitute ECUp via the signal wire L23, and performs the backup operation for continuing control of the motor 100.

As described above, in a case where the control circuit part 11 of the motor control ECU 1 malfunctions, for example, this malfunction is transmitted by the motor control ECU 2 to the substitute driving circuit part p2 of the dedicated substitute ECUp. In a case where the motor control ECU 2 performs the backup operation for continuing control of the motor 100, the motor control ECU 2 may continue to control the motor 200 that has been carried out before the malfunction occurs, or the motor control ECU 2 may not control the motor 200, and may perform only the backup operation for continuing control of the motor 100 connected with the motor control ECU 1 in which the malfunction has occurred.

According to this embodiment, the dedicated substitute ECUp may not have any substitute control circuit part, and can perform backup operation by using a control circuit part of another motor control ECU.

Interchangeable ECU

Subsequently, an example will be explained in which a motor is continuously controlled by using a motor control ECU capable of performing substitution and having a lower priority order in the above backup operation.

FIG. 6 is a figure illustrating an example of a substitution-capable ECU table stored in the storage units M1 to n of the motor control ECUs 1 to n of FIG. 5. This substitution-capable ECU table illustrates a substitution-capable motor control ECU in a case where it is assumed that there are six motor control ECUs of FIG. 5 (n=6), and a driving circuit of any one of the motor control ECUs 1 to 6 malfunctions. It should be noted that the storage units M1 to Mn may also store a control function table as illustrated in FIG. 3 and a priority order table as illustrated in FIG. 2.

For example, as illustrated in No. 1 in the control function table in FIG. 3, the motor control ECU 1 includes control functions A, B, D in a normal state. On the other hand, as illustrated in No. 2 to No. 6 in the control function table in FIG. 3, in the backup operation performed in a case where the motor control ECU 2 to the motor control ECU 6 malfunction, only the control function of both of or any one of the control functions B, D is used. Therefore, it is understood that the motor control ECU 1 can perform substitution for another of the motor control ECU 2 to the motor control ECU 6. For this reason, in the substitution-capable ECU table as illustrated in FIG. 6, "2, 3, 4, 5, 6" are set in the field of the substitution-capable motor control ECU No. of the motor control ECU 1.

For example, as illustrated in No. 5 of the control function table as illustrated in FIG. 3, the motor control ECU 5 includes control functions A, D in the normal state, but as illustrated in No. 1 to No. 4 and No. 6 in the control function table as illustrated in FIG. 3, both of the control functions B, D and the control function B are used in the backup operation in a case where another motor control ECU malfunctions. Therefore, it is understood that the motor control ECU 5 is not a substitution-capable motor control ECU. For this reason, in the substitution-capable ECU table as illustrated in FIG. 6, "nil" is set in the field of the substitution-capable motor control ECU No. of the motor control ECU 5.

In the above explanation, an example of setting the substitution-capable ECU table as illustrated in FIG. 6 on the basis of the control function table as illustrated in FIG. 3 has been described, but the substitution-capable ECU table of FIG. 6 may be set by also considering grouping and requirement in terms of the system.

In a case where any one of the motor control ECUs 1 to 6 malfunctions, another of the motor control ECUs refers to the substitution-capable ECU table in FIG. 6 and makes a setting as to which of the motor control ECUs is used to perform the backup operation. In a case where, for example, the motor control ECU 2 malfunctions, the another of the motor control ECUs refers to the substitution-capable motor control ECU No. corresponding to the motor control ECU 2 in the substitution-capable ECU table of FIG. 6 stored in the storage unit of its own. Accordingly, it is detected that the motor control ECU 3 and the motor control ECU 6 are capable of substitution. Subsequently, by referring to the priority order table as illustrated in FIG. 2, it is detected that the motor control ECU 6 has a lower priority order than the motor control ECU 3.

According to what has been described above, the motor control ECU 6 capable of substituting for the malfunctioning motor control ECU 2 having a low priority order is determined to be used for the backup operation, and thereafter, the backup operation for continuing control of the motor 200 is performed by using the motor control ECU 6 and the dedicated substitute ECUp.

Motor Control Rate

Subsequently, an example will be explained in which the motor control ECU performing the backup operation continuously control the motor that was originally controlled.

FIG. 7 is a figure illustrating an example of a motor control rate table stored in the storage units M1 to Mn. It is assumed that there are six motor control ECUs 1 to n of FIG. 5 (n=6), and any given motor control ECU malfunctions. In this case, another of the motor control ECUs uses the dedicated substitute ECUp to perform the backup operation for continuing control of the motor that was controlled by the malfunctioning motor control ECU. At this occasion, this indicates that, when the another of the motor control ECUs carry out, in a time divisional manner, processing for the motor control that was originally controlled and the motor control controlled by the malfunctioning motor control ECU, how many percent of the processing time is allocated to processing for the motor control controlled by the malfunctioning motor control ECU.

For example, in a case where the motor control ECU 2 malfunctions, and the motor control ECU 1 uses the dedicated substitute ECUp to perform the backup operation for continuing control of the motor 200, a processing time of 25% is allocated to the control of the motor 200, and the remaining 75% is allocated to the control of the motor 100 that was originally controlled in accordance with a substitution target processing time allocation rate "25%" as shown in the field of No. 1 in the motor control rate table as illustrated in FIG. 7.

As described above, in a case where a malfunction occurs in any one of the motor control ECUs 1 to n, any one of the motor control ECUs other than the malfunctioning motor control ECU performs, with a predetermined ratio in a time divisional manner, the motor control for the motor that was carried out before the malfunction occurs and the motor control using the substitute driving circuit part p2 of the dedicated substitute ECUp for the motor corresponding to the motor control ECU in which the malfunction has occurred. Therefore, the motor control ECU performing the backup operation can also continuously perform the control for the motor that was originally controlled.

Motor Priority Order

Subsequently, a case will be explained in which the motor control ECU performing the backup operation performs control in response to a motor control request having a high priority order during backup operation.

FIG. 8 is a figure illustrating an example of a motor priority order table stored in the storage units M1 to Mn. In this motor priority order table, it is assumed that there are six motor control ECUs of FIG. 5 (n=6), and the motor priority order table illustrates motor priority orders of motor control requests for the motors from the motor 100 to the motor 600. In the motor priority order, a smaller number indicates a higher priority, and a larger number indicates a lower priority.

For example, in a case where the motor control ECU 2 malfunctions, and the motor control ECU 1 performs the backup operation for continuing control of the motor 200 by using the dedicated substitute ECUp, control is executed on the motor in which a motor control request is established every time the motor control request for the motor 100 or the motor 200 is established. At this occasion, in a case where a motor control request for the motor 100 and the motor 200 occurs at the same point in time, the motor control ECU 1 selects a motor control request, which is to be executed, in accordance with the motor priority order table as illustrated in FIG. 8. For example, in a case where a right rotation motor control request for the motor 100 "rotate motor 100 in the right" and a motor control request for the motor 200 "stop motor 200" are established at the same processing time, it is understood that the request "rotate motor 100 in the right" has a motor priority order 7 from No. 7 of the motor priority order table as illustrated in FIG. 8, and it is understood that the "stop motor 200" has a motor priority order 3 from No. 3 of the motor priority order table as illustrated in FIG. 8, and accordingly, the motor control ECU 1 carries out a motor control request "stop motor 200" having a higher motor priority order.

Therefore, in a case where a malfunction occurs in the motor control ECUs 1 to n, and motor control requests occur at the same processing time, any one of the motor control ECUs other than the motor control ECU in which the malfunction has occurred performs motor control for a motor control request having a higher motor priority order chosen from among a motor control for a motor that was carried out before a malfunction occurs and a motor control for a motor corresponding to the motor control ECU in which the malfunction has occurred on the basis of the motor priority order table in response to the motor control request that has occurred. Therefore, the motor control ECU performing the backup operation can perform the motor control request having the high motor priority order during the backup operation.

Third Embodiment

Figure 9:
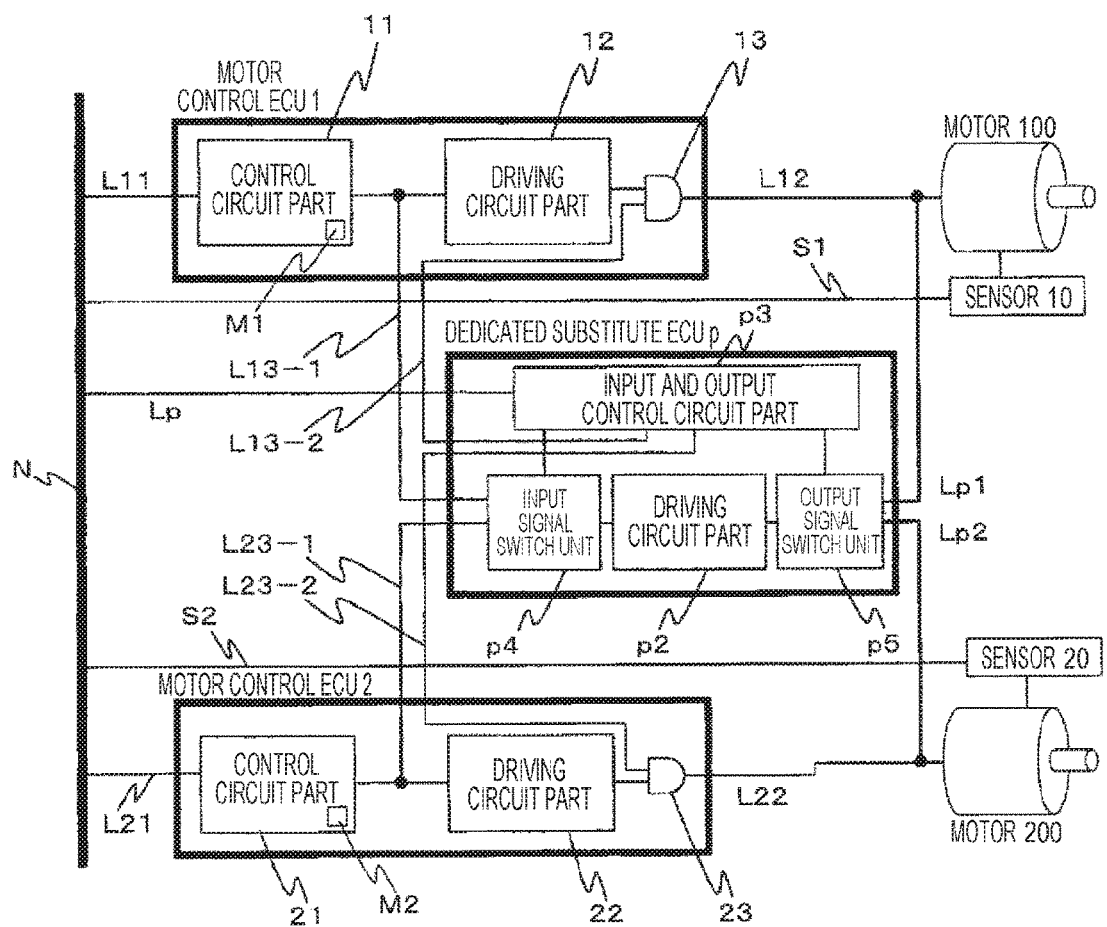
FIG. 9 is a configuration diagram illustrating a motor control system according to a third embodiment.

FIG. 9 is a configuration diagram illustrating a motor control system according to the third embodiment.

In FIG. 9, in order to easily understand the explanation, this will be explained with a configuration in which two motor control ECUs 1, 2 and motors 100, 200 are connected to a single dedicated substitute ECUp which is the minimum configuration of the embodiment, but like FIG. 5 as illustrated in the second embodiment, this will be also applicable to a configuration in which many motor control ECUs 1 to n are connected to a single dedicated substitute ECUp.

As illustrated in FIG. 9, the motor control ECUs 1, 2 control the motors 100, 200 via signal wires L12, L22 controlling the motor. The dedicated substitute ECUp is connected to the motors 100, 200 via the signal wires Lp1, Lp2 controlling the motors.

The motors 100, 200 are provided with sensors 10, 20, respectively, detecting a rotation angle, an electric current, and the like of the motor, and the motor control ECUs 1, 2 detect the states of the motors 100, 200 from the sensors 10, 20 via the signal wires S1, S2, the network N, and the signal wires L11, L21.

The motor control ECU 1 includes a control circuit part 11 and a driving circuit part 12. The motor control ECU 2 includes a control circuit part 21 and a driving circuit part 22. The configurations of the control circuit parts 11, 21 and the driving circuit parts 12, 22 are the same as those of the first embodiment, and the explanation thereabout is omitted. It should be noted that the motor control ECU 1 includes an output suppression circuit 13 suppressing an output to the motor 100 and the motor control ECU 2 includes an output suppression circuit 23 suppressing an output to the motor 200. The control circuit parts 11, 21 include storage units M1, M2, respectively.

The dedicated substitute ECUp includes a substitute driving circuit part p2, an input and output control circuit part p3, an input signal switch unit p4, and an output signal switch unit p5. The configuration of the substitute driving circuit part p2 is the same as that of the first embodiment, and the explanation thereabout is omitted. The input and output control circuit part p3 receives a request of use right from the motor control ECUs 1, 2, and switches an input of the input signal switch unit p4 and an output of the output signal switch unit p5.

Hereinafter, an operation of the motor control system according to the third embodiment will be explained with reference to FIG. 9.

A case where the driving circuit parts 12, 22 of any one of the motor control ECUs 1, 2 malfunctions will be explained.

In a case where any one of the motor control ECUs 1, 2, for example, the driving circuit part 12 of the motor control ECU 1, malfunctions, the motor control ECU 1 stops the output of a control signal such as a PWM signal for controlling the motor 100 that was output by the control circuit part 11 to the driving circuit part 12, and requests the dedicated substitute ECUp for the use right via the signal wire L11, the network N, and the signal wire Lp.

In a case where the input and output control circuit part p3 of the dedicated substitute ECUp receives a request of use right, an input of the input signal switch unit p4 is configured to be the signal wire L13-1 from the motor control ECU 1 if the dedicated substitute ECUp is not used for another of the motor control ECUs 2 to n. Further, the input and output control circuit part p3 makes a configuration so that the output of the output signal switch unit p5 is the signal wire Lp1 for output to the motor 100, and by using the signal wire L13-1, the output from the motor control ECU 1 to the motor 100 is stopped by using the output suppression circuit 13. The output suppression circuit 13 is, for example, a circuit for shutting off an output, such as a relay.

Thereafter, the input and output control circuit part p3 of the dedicated substitute ECUp notifies the motor control ECU 1 that a use right is given via the signal wire Lp, the network N, and the signal wire L11.

When the motor control ECU 1 receives a notification of a use right, the motor control ECU 1 outputs a control signal for the motor 100 to the input signal switch unit p4 of the dedicated substitute ECUp from the control circuit part 11 via the signal wire L13-1. Therefore, the substitute driving circuit part p2 of the dedicated substitute ECUp can perform the backup operation for continuing control of the motor 100.

Subsequently, an operation in a case where the control circuit parts 11, 21 of any one of the motor control ECUs 1, 2 malfunctions will be hereinafter explained.

In a case where any one of the motor control ECUs 1, 2, for example, the control circuit part 11 of the motor control ECU 1, malfunctions, the motor control ECU 2 detects a malfunction of the motor control ECU 1 via the signal wire L21, the network N, and the signal wire L11.

In a case where the motor control ECU 2 detects a malfunction of the motor control ECU 1, the motor control ECU 2 requests the dedicated substitute ECUp for a use right via the signal wire L21, the network N, and the signal wire Lp.

In a case where the input and output control circuit part p3 of the dedicated substitute ECUp receives a request of use right, the input and output control circuit part p3 of the dedicated substitute ECUp makes a configuration so that the input of the input signal switch unit p4 is the signal wire L23-1 from the motor control ECU 2 if the dedicated substitute ECUp is not used for another of the motor control ECUs. Further, the output of the output signal switch unit p5 is configured to be the output to the motor 100 via the signal wire Lp1, and by using the signal wire L13-2, the output from the motor control ECU 1 to the motor 100 is stopped by using the output suppression circuit 13. The output suppression circuit 13 is, for example, a circuit for shutting off an output, such as a relay.

Thereafter, the motor control ECU 2 is notified that a use right is given via the signal wire Lp, the network N, and the signal wire L21.

When the motor control ECU 2 receives a notification of use right, the motor control ECU 2 outputs a control signal for the motor 100 to the input signal switch unit p4 of the dedicated substitute ECUp from the control circuit part 21 via the signal wire L23-1, so that the backup operation for continuing control of the motor 100 can be performed.

At this occasion, the motor control ECU 2 detects the state of the motor 100 from the sensor 10 via the signal wire S1 and the signal wire L21. Depending on the system, the sensor 10 may not be provided.

First Modification of Third Embodiment

Modifications of the third embodiment will be explained with reference to FIG. 10.

Figure 10:
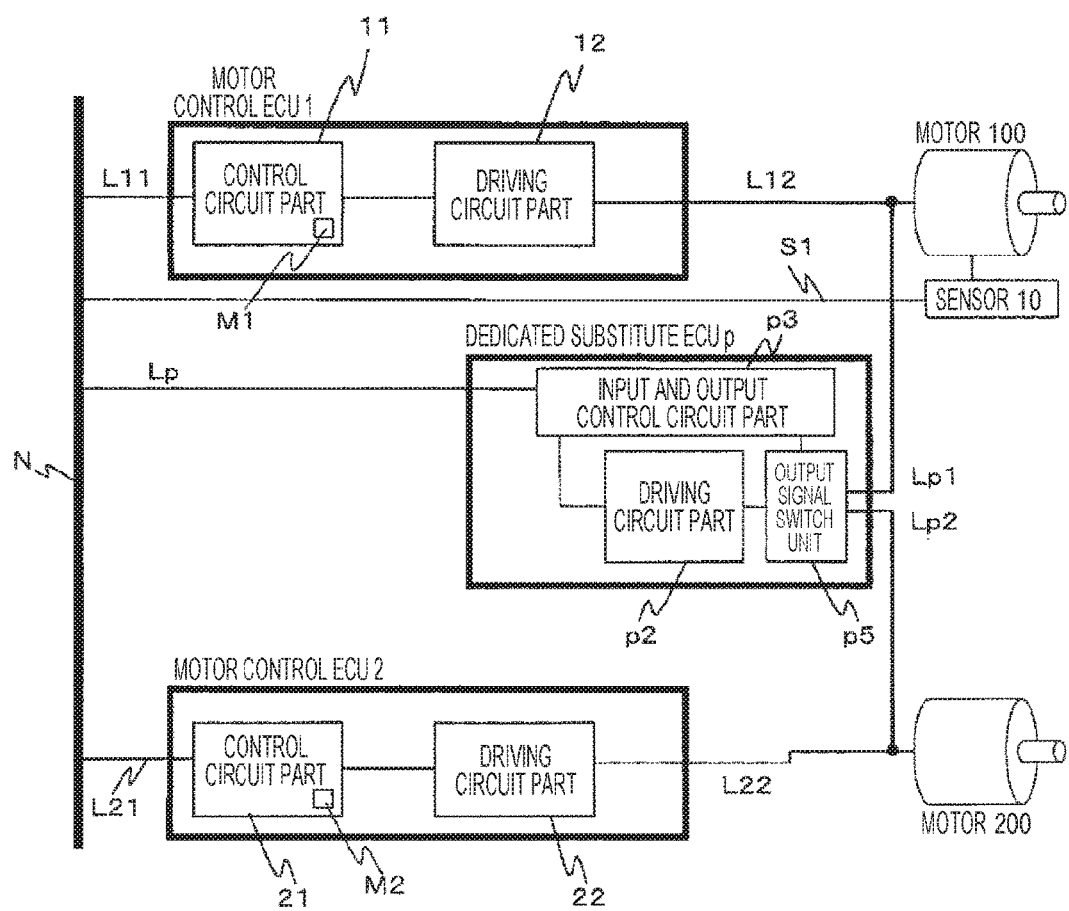
FIG. 10 is a configuration diagram illustrating a motor control system according to a first modification of the third embodiment.

In FIG. 10, in order to easily understand the explanation, this will be explained with a configuration in which motor control ECUs 1, 2 and motors 100, 200 are connected to a single dedicated substitute ECUp which is the minimum configuration of the embodiment, but like FIG. 5 as illustrated in the second embodiment, this will be also applicable to a configuration in which many motor control ECUs 1 to n are connected to a single dedicated substitute ECUp.

A difference from the third embodiment explained with reference to FIG. 9 lies in that a control signal such as a PWM signal for controlling the motors 100, 200 that is output to the driving circuit parts 12, 22 from the control circuit parts 11, 21 of the motor control ECUs 1, 2 is converted into an information transmission format on the network N, and the information transmission format is output to the dedicated substitute ECUp via the signal wires L11, L21, the network N, and the signal wire Lp.

A backup operation will be explained in a case where the driving circuit part 12 of the motor control ECU 1 malfunctions.

In a case where the driving circuit part 12 of the motor control ECU 1 malfunctions, the motor control ECU 1 stops the output of a control signal such as a PWM signal for controlling the motor 100 that is output from the control circuit part 11 to the driving circuit part 12, and the motor control ECU 1 requests the dedicated substitute ECUp for a use right via the signal wire L11, the network N, and the signal wire Lp.

In a case where the input and output control circuit part p3 of the dedicated substitute ECUp receives a request of use right, the output of the output signal switch unit p5 is configured to be the signal wire Lp1 for output to the motor 100 if the dedicated substitute ECUp is not used for another of the motor control ECUs.

Thereafter, the motor control ECU 1 is notified that a use right is given via the signal wire Lp, the network N, and the signal wire L11.

When the motor control ECU 1 receives a notification of use right, the motor control ECU 1 converts a control signal for the motor 100 into an information transmission format on the network N with the control circuit part 11, and outputs the information transmission format to the dedicated substitute ECUp via the signal wire L11, the network N, and the signal wire Lp. The information transmission format is information representing, for example, a duty ratio, a target electric current, and the like in association with the PWM signal.

The dedicated substitute ECUp restores the output into a control signal such as a PWM signal for controlling the motor 100 with the input and output control circuit part p3, and outputs the control signal to the substitute driving circuit part p2, so that the backup operation for continuing control of the motor 100 is enabled.

Subsequently, backup operation will be explained in a case where the control circuit part 11 of the motor control ECU 1 malfunctions.

In a case where the control circuit part 11 of the motor control ECU 1 malfunctions, the motor control ECU 2 detects a malfunction of the motor control ECU 1 via the signal wire L21, the network N, and the signal wire L11.

In a case where the motor control ECU 2 detects a malfunction of the motor control ECU 1, the motor control ECU 2 requests the dedicated substitute ECUp for use right via the signal wire L21, the network N, and the signal wire Lp.

When the input and output control circuit part p3 of the dedicated substitute ECUp receives a request for use right, the output of the output signal switch unit p5 is configured to be the signal wire Lp1 for output to the motor 100 if the dedicated substitute ECUp is not used for another of the motor control ECUs.

Thereafter, the motor control ECU 2 is notified that a use right is given via the signal wire Lp, the network N, and the signal wire L21.

When the motor control ECU 2 receives a notification of use right, the motor control ECU 2 converts the control signal for the motor 100 into an information transmission format on the network N with the control circuit part 21, and outputs the information transmission format to the dedicated substitute ECUp via the signal wire L21, the network N, and the signal wire Lp.

The dedicated substitute ECUp restores the received information transmission format into a control signal such as a PWM signal for controlling the motor 100 with the input and output control circuit part p3, and outputs the control signal to the substitute driving circuit part p2, so that the backup operation for continuing control of the motor 100 is enabled.

At this occasion, the motor control ECU 2 detects information about the sensor 10 (for example, an electric current sensor) from the motor 100 via the signal wire S1, obtains the information via the network N and the signal wire L21, and continues to control the motor 100. Depending on the system, the sensor 10 may not be provided.

Second Modification of Third Embodiment

A modification of the third embodiment will be explained with reference to FIG. 11.

Figure 11:
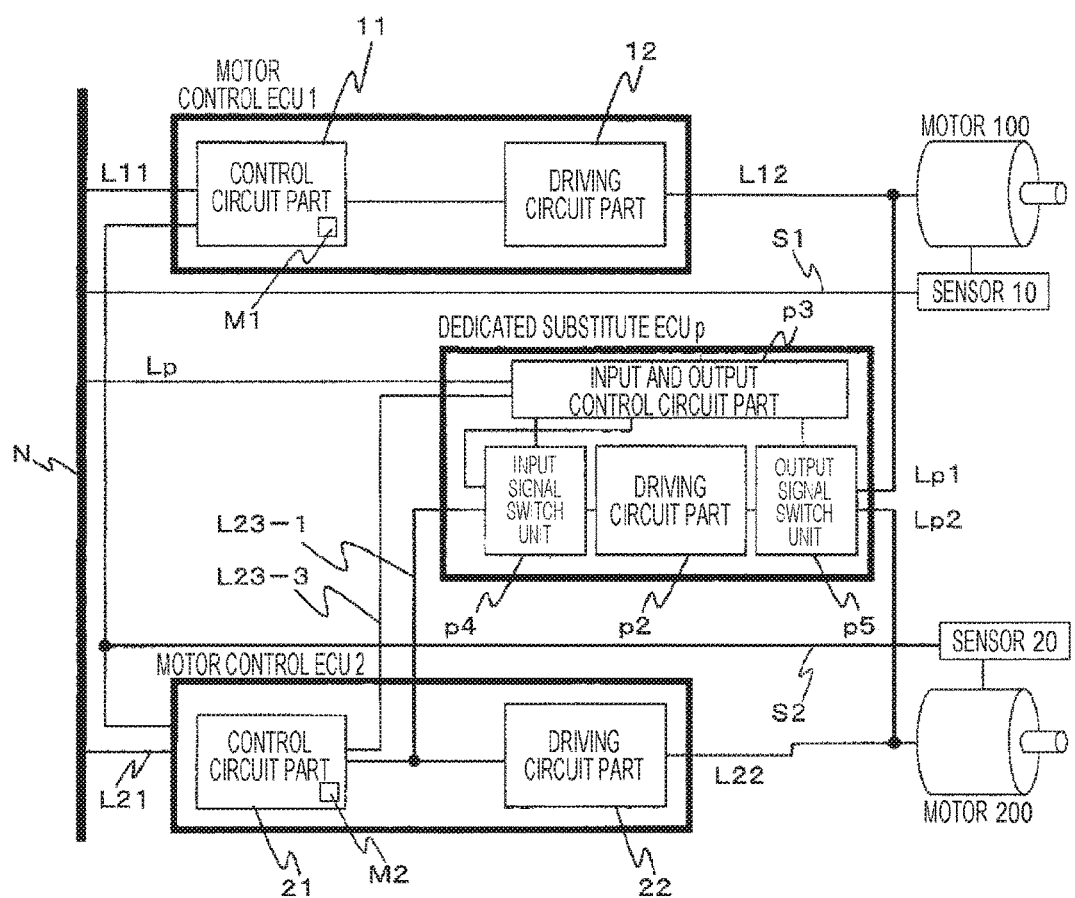
FIG. 11 is a configuration diagram illustrating a motor control system according to a second modification of the third embodiment.

In FIG. 11, in order to easily understand the explanation, this will be explained with a configuration in which motor control ECUs 1, 2 and motors 100, 200 are connected to a single dedicated substitute ECUp which is the minimum configuration of the embodiment, but like FIG. 5 as illustrated in the second embodiment, this will be also applicable to a configuration in which many motor control ECUs 1 to n are connected to a single dedicated substitute ECUp. The same elements as those of the third embodiment as illustrated in FIG. 9 will be denoted with the same reference numerals, and the explanation thereabout is omitted.

The motors 100, 200 are provided with sensors 10, 20, respectively, detecting a rotation angle, an electric current, and the like of the motor, and the motor control ECU 1 detects the state of the motor 100 from the sensor 10 via the signal wire S1, the network N, and the signal wire L11. The motor control ECUs 1, 2 detects the state of the motor 200 from the sensor 20 via the signal wire S2.

In FIG. 11, when the driving circuit part 12 malfunctions, the motor control ECU 1 performs both of an acquisition of the use right of the dedicated substitute ECUp and a signal output for controlling the motor 100 to the dedicated substitute ECUp via the signal wire L11, the network N, and the signal wire Lp.

A backup operation of the motor control ECU 2 will be explained in a case where the driving circuit part 22 malfunctions.

In a case where the driving circuit part 22 malfunctions, the motor control ECU 2 performs acquisition of the use right of the dedicated substitute ECUp via the signal wire L23-3 which is the dedicated wire, and performs the signal output for controlling the motor 200 via the signal wire L23-1.

The motor control ECU 2 obtains the use right of the dedicated substitute ECUp by using the signal wire L23-3 which is the dedicated wire, so that the use right of the dedicated substitute ECUp can be obtained in a shorter time than the method relying on the network N.

The motor control ECU 2 performs the signal output for controlling the motor 200 via the signal wire L23-1, so that, as compared with the case where the signal output is performed via the signal wire L21, the network N, and the signal wire Lp, it is not necessary to perform conversion and restoration processing into the information transmission format on the network N, and therefore, the motor 200 can be controlled more quickly.

Information about the sensor 20 (for example resolver sensor) detecting the state of the motor 200 is also directly input into the motor control ECU 1 and the motor control ECU 2 via signal wire S2 without the network N, so that the delay time caused by the network N can be avoided.

Subsequently, backup operation will be explained in a case where the control circuit part 11 of the motor control ECU 1 malfunctions.

In a case where the control circuit part 11 of the motor control ECU 1 malfunctions, the motor control ECU 2 detects a malfunction of the motor control ECU 1 via the signal wire L21, the network N, and the signal wire L11.

The motor control ECU 2 performs an acquisition of use right of the dedicated substitute ECUp via the signal wire L23-3 which is a dedicated wire, and performs a signal output for controlling the motor 100 via the signal wire L23-1.

The motor control ECU 2 obtains the use right of the dedicated substitute ECUp by using the signal wire L23-3 which is the dedicated wire, so that the use right of the dedicated substitute ECUp can be obtained in a shorter time than the method relying on the network N.

The motor control ECU 2 performs the signal output for controlling the motor 100 via the signal wire L23-1, so that, as compared with the case where the signal output is performed via the signal wire L21, the network N, and the signal wire Lp, it is not necessary to perform conversion and restoration processing into the information transmission format on the network N, and therefore, this enables the backup operation for controlling the motor 100 more quickly.

Third Modification of Third Embodiment

In the third embodiment, in order to easily understand the explanation, this will be explained with a configuration in which two motor control ECUs 1, 2 and two motors 100, 200 are connected to a single dedicated substitute ECUp which is the minimum configuration of the embodiment, but like FIG. 5 as illustrated in the second embodiment, this will be also applicable to a configuration in which many motor control ECUs 1 to n are connected to a single dedicated substitute ECUp. In this case, the control circuit parts 11 to n1 of the motor control ECUs 1 to n are provided with storage units M1 to n, which store a priority order table, a control function table, a substitution-capable ECU table, a motor control rate table, a motor priority order table, and the like. Then, like what has been described in the second embodiment, by referring to these tables, the control circuit parts 11 to n1 may be configured to execute control of a substitution-capable ECU, a motor control rate, a motor priority order, and the like.

The embodiments explained above may be configured in accordance with the modifications described below.

(1) In the first embodiment, the substitute control circuit part p1 is provided with the storage unit M, and the storage unit M stores various kinds of tables. In the second embodiment and the third embodiment, the control circuit parts 11 to n1 are provided with storage units M1 to Mn, and the storage units M1 to Mn store various kinds of tables. However, these tables may be stored anywhere as long as the table can be referred to by the control circuit part. For example, these tables may be stored in another ECU (not shown) connected to the network N.

(2) In the first embodiment, the substitute control circuit part p1 is provided with the storage unit M, and the storage unit M is provided with various kinds of tables. In the second embodiment and the third embodiment, the control circuit parts 11 to n1 are provided with the storage units M1 to n, and the storage units M1 to n store various kinds of tables. However, these tables may be defined in programs of the substitute control circuit part p1, the control circuit parts 11 to n1, and the like.

(3) In the first embodiment to the third embodiment, the control circuit part and the like are explained as hardware, but the functions thereof may be achieved with a CPU and a program.

According to the embodiments described above, the following actions and effects can be obtained.

(1) A motor control system comprising a plurality of motors 100 to n and a dedicated substitute ECUp connected to a plurality of motor control ECUs 1 to n controlling the motors 100 to n in association with the plurality of motors 100 to n, wherein in a case where a malfunction occurs in any one of the motor control ECUs 1 to n, the dedicated substitute ECUp controls the motor connected to the motor control ECU in which the malfunction has occurred. Therefore, since it is not necessary to prepare a dedicated backup ECU for each of the motor control ECUs, the motor control ECUs 1 to n can be backed up at a low cost.

The present invention is not limited to the above embodiment, and as long as the features of the present invention are not lost, other modes that could be conceived of within the scope of the technical scope of the present invention are also included in the scope of the present invention. Alternatively, a configuration combining the above embodiment and multiple modifications may also be made.

REFERENCE SIGNS LIST 11 to n1 control circuit part
12 to n2 driving circuit part
N network
p dedicated substitute ECU
p1 substitute control circuit part
p2 substitute driving circuit part
M storage unit
M1 to Mn storage unit

The invention claimed is:

1. A motor control system comprising:
a plurality of motors and a dedicated substitute ECU connected to a plurality of motor control ECUs controlling the motors in association with the motors,
wherein in a case where a malfunction occurs in any one of the motor control ECUs, the dedicated substitute ECU controls the motor connected to the motor control ECU in which the malfunction has occurred, and
wherein in a case where malfunctions occur in two or more of the motor control ECUs, the dedicated substitute ECU controls the motor connected to said one of the motor control ECUs in which the malfunction has occurred and of which priority order stored is a highest.

2. The motor control system according to claim 1, wherein the motor control ECU in which the malfunction has occurred includes a control circuit part generating a control signal and a driving circuit part receiving the control signal and generating a driving signal of a motor, and
the dedicated substitute ECU includes a substitute driving circuit part for substituting for the driving circuit part of the motor control ECU in which the malfunction has occurred.

3. The motor control system according to claim 2, wherein the dedicated substitute ECU further includes a substitute control circuit part substituting for the control circuit part of the motor control ECU in which the malfunction has occurred, and
the substitute control circuit part has a control function required when the control circuit part of the motor control ECU malfunctions.

4. A motor control system comprising:
a plurality of motors and a dedicated substitute ECU connected to a plurality of motor control ECUs controlling the motors in association with the motors, and
a priority order storage unit storing a priority order of the plurality of motor control ECUs, wherein
in a case where a malfunction occurs in any one of the motor control ECUs, the dedicated substitute ECU controls the motor connected to the motor control ECU in which the malfunction has occurred, and
in a case where malfunctions occur in two or more of the motor control ECUs, the dedicated substitute ECU controls the motor connected to one of the motor control ECUs in which the malfunction has occurred and of which priority order stored is a highest.

5. A motor control system comprising:
a plurality of motors and a dedicated substitute ECU connected to a plurality of motor control ECUs controlling the motors in association with the motors, wherein
in a case where a malfunction occurs in any one of the motor control ECUs, the dedicated substitute ECU controls the motor connected to the motor control ECU in which the malfunction has occurred, the motor control ECU in which the malfunction has occurred includes a control circuit part generating a control signal and a driving circuit part receiving the control signal and generating a driving signal of a motor, the dedicated substitute ECU includes a substitute driving circuit part for substituting for the driving circuit part of the motor control ECU in which the malfunction has occurred, and in a case where a malfunction occurs in the control circuit part in any one of the motor control ECUs, any one of the motor control ECUs other than the motor control ECU in which the malfunction has occurred uses the substitute driving circuit part of the dedicated substitute ECU to control the motor connected to the motor control ECU in which the malfunction has occurred.

6. The motor control system according to claim 5, comprising a priority order storage unit storing a priority order of the plurality of motor control ECUs, wherein in a case where a malfunction occurs in the control circuit part in any one of the motor control ECUs, a motor control ECU which is a motor control ECU other than the motor control ECUs in which the malfunction has occurred and of which priority order is a lowest uses the substitute driving circuit part of the dedicated substitute ECU to control the motor connected to the motor control ECU in which the malfunction has occurred.

7. The motor control system according to claim 5, comprising a substitution-capable ECU storage unit storing information about a substitution-capable motor control ECU for each of the plurality of motor control ECUs, wherein in a case where a malfunction occurs in the control circuit part in any one of the motor control ECUs, any one of the motor control ECUs other than the motor control ECU in which the malfunction has occurred determines a substitution-capable motor control ECU on the basis of information stored in the substitution-capable ECU storage unit, and the determined motor control ECU uses the substitute driving circuit part of the dedicated substitute ECU to control the motor connected to the motor control ECU in which the malfunction has occurred.

8. The motor control system according to claim 7, comprising a priority order storage unit storing a priority order of the plurality of motor control ECUs, wherein in a case where a malfunction occurs in the control circuit part in any one of the motor control ECUs, any one of the motor control ECUs other than the motor control ECU in which the malfunction has occurred determines a substitution-capable motor control ECU on the basis of information stored in the substitution-capable ECU storage unit and the priority order stored in the priority order storage unit.

9. The motor control system according to claim 5, wherein in a case where a malfunction occurs in the control circuit part in any one of the motor control ECUs, any one of the motor control ECUs other than the motor control ECU in which the malfunction has occurred does not perform motor control of the motor that is carried out before the malfunction occurs, and controls the motor connected to the motor control ECU in which the malfunction has occurred.

10. The motor control system according to claim 5, wherein in a case where a malfunction occurs in the control circuit part in any one of the motor control ECUs, any one of the motor control ECUs other than the motor control ECU in which the malfunction has occurred performs a control of the motor that is carried out before the malfunction occurs and a control of the motor connected to the motor control ECU in which the malfunction has occurred in a time divisional manner in accordance with a rate determined in advance.

11. The motor control system according to claim 10, comprising a motor control rate storage unit previously storing a motor control rate indicating a rate of a motor control between a motor control before a malfunction and a motor control after the malfunction, wherein in a case where a malfunction occurs in the control circuit part in any one of the motor control ECUs, any one of the motor control ECUs other than the motor control ECU in which the malfunction has occurred performs motor control in a time divisional manner in accordance with the motor control rate stored in the motor control rate storage unit.

12. The motor control system according to claim 5, comprising a motor priority order storage unit storing a motor priority order according to which a motor control request for the plurality of motors is received, wherein in a case where a malfunction occurs in the control circuit part or the driving circuit part in any one of the motor control ECUs, and the motor control requests occur at a same processing time, any one of the motor control ECUs other than the motor control ECU in which the malfunction has occurred performs any one of a motor control for a motor that is carried out before the malfunction occurs and a motor control for a motor corresponding to the motor control ECU in which the malfunction has occurred whichever is performed for a motor control request having a higher motor priority order, on the basis of the motor priority order in response to the motor control request that has occurred.

13. A motor control system comprising:

a plurality of motors and a dedicated substitute ECU connected to a plurality of motor control ECUs controlling the motors in association with the motors, wherein the motor control ECU in which the malfunction has occurred includes a control circuit part generating a control signal and a driving circuit part receiving the control signal and generating a driving signal of a motor, the dedicated substitute ECU includes a substitute driving circuit part for substituting for the driving circuit part of the motor control ECU in which the malfunction has occurred, and in a case where a malfunction occurs in the driving circuit part in any one of the motor control ECUs, the control circuit part of the motor control ECU in which the malfunction has occurred uses the substitute driving circuit part of the dedicated substitute ECU to control the motor connected to the motor control ECU in which the malfunction has occurred.

14. The motor control system according to claim 13 comprising a dedicated wire connecting the control circuit part of the motor control ECU in which the malfunction has occurred and the substitute driving circuit part of the dedicated substitute ECU, wherein the control circuit part of the motor control ECU in which the malfunction has occurred is connected via the dedicated wire to the substitute driving circuit part of the dedicated substitute ECU, and controls the motor connected to the motor control ECU in which the malfunction has occurred.

\* \* \* \* \*